May 7, 1963     C. C. OLDENBURG     3,088,984
PROCESS FOR THE ISOMERIZATION OF ALKYL BENZENES IN THE
PRESENCE OF A USED HYDROCRACKING CATALYST
Filed Dec. 19, 1960
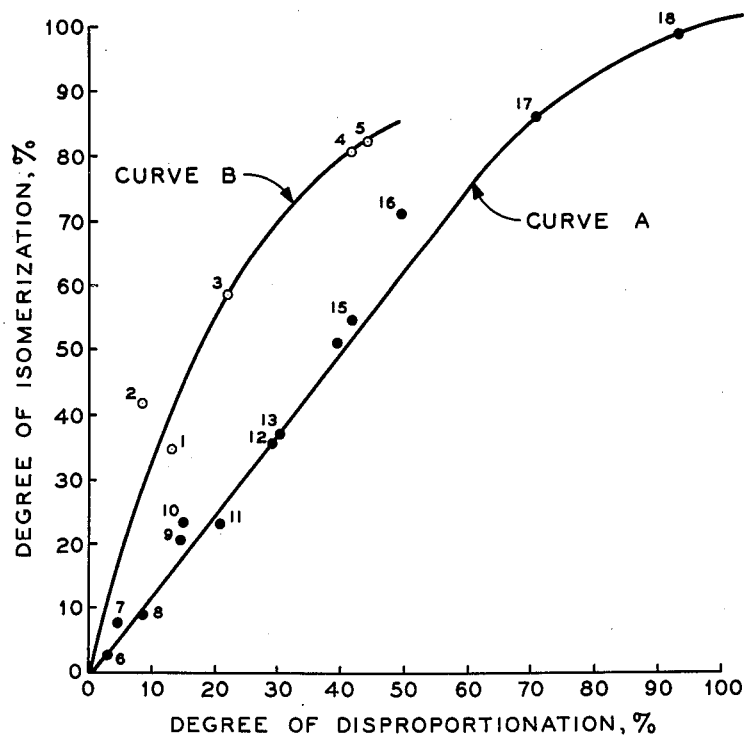
INVENTOR
CHARLES C. OLDENBURG
BY
ATTORNEYS United States Patent Office 3,088,984
Patented May 7, 1963

3,088,984
PROCESS FOR THE ISOMERIZATION OF ALKYL BENZENES IN THE PRESENCE OF A USED HYDROCRACKING CATALYST
Charles C. Oldenburg, San Rafael, Calif., assignor to California Research Corporation, San Francisco, Calif., a corporation of Delaware
Filed Dec. 19, 1960, Ser. No. 76,594
2 Claims. (Cl. 260—668)

This invention relates to a process for the catalytic isomerization of alkyl benzenes containing more carbon atoms per molecule than toluene, and, more particularly, to the isomerization of such compounds in the presence of a used hydrocracking catalyst so as to reduce disproportionation (or methyl transfer) and hydrogenation.

At the present time, such alkyl benzenes as the isomeric xylenes are important in the chemical industries. Thus, paraxylene is used as a starting material in the production of polyester fibers; metaxylene is used to produce isophthalic acid, which, in turn, is employed in the manufacture of, for example, plasticizers and alkyd resins for surface coatings; and orthoxylene is used in the production of phthalic anhydride, likewise used in the manufacture of plasticizers and alkyd resins.

A variety of methods have been developed for separating the individual xylene isomers from xylene and ethylbenzene-containing mixtures in relatively high purity. Because of the closeness of the boiling points of the xylenes and ethylbenzene, preparation by simple fractionation is not possible so as to obtain essentially pure components and, as a result, the commercial methods that have been developed include fractional crystallization, extraction and superfractional distillation. In any of these methods, a residual xylene fraction containing the non-separated isomers is recovered as a mother liquor, a raffinate, or a distillation fraction, depending upon the particular separation method employed. This residual fraction ordinarily contains more than half of the total xylene material which is subjected to the separation process. The desirability of isomerizing this non-equilibrium fraction to produce further quantities of the wanted isomer is apparent and various methods for accomplishing this result have been suggested. However, it is known that the isomerization reaction is generally accompanied by excessive amounts of disproportionation and, in some cases, hydrogenation also.

It is an object of the present invention to provide an isomerization process wherein these undesirable reactions are considerably reduced.

According to the present isomerization process, an alkyl benzene hydrocarbon feed, said feed containing alkyl benzenes having more carbon atoms per molecule than toluene, is contacted, along with added hydrogen, in an isomerization zone, with a catalyst comprising a hydrogenation component selected from the group consisting of nickel sulfide and cobalt sulfide disposed on an active cracking catalyst support, the catalyst having previously been used for the hydrocracking of distillate fractions for at least 100 hours. The isomerization zone is maintained at an elevated temperature below about 800° F. and at an elevated pressure above about 300 p.s.i.g. A product fraction is recovered from the isomerization zone in an amount equal to about at least 80 volume percent of the initial feed and which is further characterized by a substantially closer approach to the alkyl benzene isomerization equilibrium than the initial feed stock. When its initial feed is a non-equilibrium mixture of xylenes, the product fraction will be further characterized by a $C_8$ aromatic hydrocarbon content of at least 65 volume percent.

While the invention will be described with particular emphasis on the isomerization of either a single $C_8$ aromatic isomer or a non-equilibrium mixture thereof (including ethylbenzenes), it must be understood that, whereas the xylenes are preferred feed stocks to the present process, the invention is generally applicable to the isomerization of alkyl benzenes containing more carbon atoms per molecule than toluene, including the higher homologs embracing a higher and/or a larger number of alkyl side chains.

The crux of the present invention lies in the use of previously used, or aged, catalyst. While it is entirely possible to employ a fresh catalyst composed of nickel sulfide and/or cobalt sulfide disposed upon an active cracking catalyst support to isomerize alkyl benzene hydrocarbons, it has been found that the undesirable accompanying reactions of hydrogenation and disproportionation can be considerably reduced by isomerizing in the presence of the same catalyst composition but which has been previously used in a hydrocracking reaction for at least 100 hours. The reason for this improved result is not understood at the present time.

The catalyst support may comprise any one or more of such acidic materials as the conventional cracking catalysts containing composites of silica-alumina, silica-magnesia, silica-alumina-zirconia, acid-treated clays, $BF_3$-activated alumina, and the like. In addition, satisfactory results can be obtained with synthetic aluminum silicates (such as the synthetic chabazites, commonly referred to as "molecular sieves") that impart the necessary cracking activity to the catalyst. The preferred cracking catalyst supports are synthetically-prepared silica-alumina having silica contents in the range of from about 40 to 99%. The total amount of nickel sulfide and/or cobalt sulfide components disposed on the support may be varied within relatively wide limits of from about 0.1 to 35% (as the metal), based on the weight of the entire catalyst composition.

The catalyst employed in the subject process can be prepared in various ways. For example, the catalyst can be prepared by impregnating a synthetic silica-alumina cracking catalyst support with sufficient nickel nitrate to give the impregnated silica-alumina the desired nickel content. The nitrate is decomposed and the impregnated support is then sulfided by contacting it with hydrogen sulfide or with hydrogen and a low molecular weight mercaptan or organic sulfide at temperatures below about 750° F., and preferably below 700° F. The catalyst can also be prepared by impregnating a silica-alumina support with a nickel compound, drying the impregnated support, and then heating it to a temperature in the range 1200–1600° F. for a period of about 0.25 to 48 hours. After the heat treatment, the catalyst can be sulfided in the manner indicated above at temperatures below about 750° F.

Following preparation, the fresh catalyst is inserted into a catalytic reaction zone (which may be the isomerization reactor of the invention) and is subjected to contact, for at least 100, and preferably about 350 hours, with a hydrocarbon distillate and added hydrogen under hydrocracking conditions. Suitable distillates are thermally and catalytically cracked naphthas, and cycle oils, naphthas, kerosenes and gas oils derived from virgin stocks, coker distillates, and oil fractions derived from shale, tar sands and coal tar. Also suitable are various raffinates or extracts recovered in the normal refining of petroleum-type hydrocarbons. In general, the hydrocarbon distillates should boil within the range of from about 150° to 1000° F., preferably from about 330° to 850° F. At least 1500 s.c.f. (standard cubic feet) of added hydrogen should be employed in the hydrocracking zone. The hydrocracking conditions can be varied greatly, but will generally be conducted at temperatures from about 350° to 1000° F., elevated pressures of from about 150 to 3000 p.s.i.g. and space velocities of from about 0.1 to 15.0 L.H.S.V. (liquid hourly space velocity). The conditions within the hydrocracking zone are adjusted such that at least 20, and preferably from 40 to 75, volume percent of the distillate feed is converted to products boiling below the initial boiling point of the feed.

After being employed in the hydrocracking zone for the prescribed period, the catalyst can be removed and used for the isomerization of alkyl benzenes under the conditions hereinafter described. However, as noted above, the hydrocracking and isomerization zones can be a single reactor. In that case, all that need be done is to halt the flow of distillate and adjust the reaction conditions to those used in the isomerization reaction.

The isomerization zone is maintained at an elevated temperature below about 800° F., preferably in the range from about 475° to 650° F. and the pressure is maintained above about 300 lbs. with a preferred range being about 500 to 2000 p.s.i.g. Space rates are generally within the range of from about 0.1 to 10.0 L.H.S.V. At least 500, and preferably from 2000 to 3000, s.c.f. of hydrogen per barrel of feed is passed along with the feed into the isomerization zone. Inasmuch as the catalyst of the present invention has been previously employed as a hydrocracking catalyst, the reaction conditions of temperature, pressure and space velocity are adjusted within the defined ranges such that hydrocracking is minimized. These reaction conditions are so regulated that there is recovered from the isomerization zone a product stream boiling above the initial boiling point of the feed in an amount equal to at least 80 volume percent of the feed. Under such conditions, and when employing a non-equilibrium xylene feed, the product stream will contain at least 65 volume percent of $C_8$ aromatic hydrocarbon and will be further characterized by a substantially closer approach to xylene isomerization equilibrium than the initial feed.

The isomerization zone (and hydrocracking zone if the same reactor is employed for both reactions) of the present process is well adapted to any type of feed-catalyst contacting system. Thus, such methods as fixed-bed, moving bed, slurry or fluid catalyst systems can be employed by procedures well known in the art. The preferred method is that employing at least one fixed catalyst bed. Catalyst regeneration can be performed, for example, by contacting the catalyst with an oxygen-containing gas at temperatures of from about 700° to 1000° F. and then reducing the resulting nickel and/or cobalt oxide to the metal and then sulfiding (in situ, if desired) by contacting the catalyst at temperatures below 750° F. with hydrogen and $H_2S$ or gaseous compounds capable of generating $H_2S$. In some cases, it may be desirable to eliminate the reduction step by sulfiding the oxide directly. When regenerating, it is unnecessary to employ the catalyst again in the hydrocracking reaction since its favorable effect on isomerization will normally not be lost during either the isomerization or regeneration operations.

The present invention is exemplified by the following examples:

EXAMPLES

A number of isomerization runs were made using essentially fresh catalyst and catalysts that had been previously used in the hydrocracking of petroleum distillates. In all of the runs, the feed was contacted with a catalyst comprising about 6 weight percent nickel sulfide (as the metal) disposed on a synthetic silica-alumina cracking catalyst composite containing about 90 weight percent silica and about 10 weight percent alumina. Three used catalysts and one substantially fresh catalyst were employed, the latter for comparative purposes only. The designations and previous use of the catalysts are as follows:

Catalyst A

This catalyst had been used for 863 hours in hydrocracking light catalytic cycle oil (boiling range 382° to 557° F.) at temperatures from about 565° to 580° F., an L.H.S.V. of 0.8, a hydrogen rate of 6500 s.c.f. per barrel of feed, and a pressure of 1200 p.s.i.g. to convert 60 volume percent of the feed to products boiling below the initial boiling point of the feed (synthetic product). The catalyst was then used for 581 hours in hydrocracking an aromatic hydrocarbon fraction (boiling range 318° to 427° F.) at temperatures from about 610° to 650° F., and pressures in the range 1200 to 1800 p.s.i.g. to convert 45 volume percent to synthetic product. Thus, the catalyst had been used for a total of 1444 hours in the hydrocracking of petroleum distillates.

Catalyst B

This catalyst had been used for 360 hours in hydrocracking light catalytic cycle oil (boiling range 395° to 559° F.) at a temeprature of from 565° to 610° F., a pressure of 1200 p.s.i.g., an L.H.S.V. of 1.67 and a hydrogen rate of 6500 s.c.f. per barrel of feed to convert 60 volume percent of the feed to synthetic products.

Catalyst C

This catalyst had been used 780 hours in the hydrocracking of the same light cycle oil described under the heading "Catalyst B" at a temperature of from 540° to 670° F., a pressure of 1200 p.s.i.g., an L.H.S.V. varying from 0.7 to 2.2, and a hydrogen rate of 12,000 s.c.f. per barrel of feed to convert 80 volume percent of the feed to synthetic product.

Catalyst D

This catalyst, essentially fresh and not included within the scope of the present invention, had been used 14 hours in the hydrocracking of the light cycle oil previously described at a temperature of 570° F., a pressure of 1200 p.s.i.g., an L.H.S.V. of 2.0, and a hydrogen rate of 12,000 s.c.f. per barrel of feed to convert 60 volume percent of the feed to synthetic product.

In all of the runs, the feeds were non-equilibrium xylene mother liquor fractions obtained from a paraxylene fractional crystallization plant. All of the feeds had compositions (volume percent) falling within the following ranges:

| | |
|---|---|
| Ethylbenzene | 25.9±2.7 |
| Orthoxylene | 10.8±1.6 |
| Metaxylene | 51.7±0.8 |
| Paraxylene | 7.9±0.9 |
| Non-aromatic hydrocarbons | 5.8±0.8 |

The feeds, along with added hydrogen, were contacted at a presure of 1200 p.s.i.g. with from 50 to 220 ml. of catalyst in a fixed catalyst bed. The reactor effluents were stripped of hydrogen and the liquid product, amounting in all cases to over 95 volume percent of the feed, was analyzed by mass spectrometric methods for group type and distribution of aromatics and by gas-liquid partition chromatography for $C_8$ aromatic distribution. The table presents the run conditions and data obtained from these runs.

The terms "Degree of Isomerization" and "Degree of Disproportionation" appearing on the table are calculated from the data obtained in the exemplary runs. They are calculated from the following formulas:

$$\text{Degree of isomerization} = \frac{A_p - A_f}{A_e - A_f} \times 100$$

wherein:

$A_p$ is the paraxylene content of the three isomeric xylenes in the product, expressed in volume percent.

$A_f$ is the paraxylene content of the three isomeric xylenes in the feed, expressed in volume percent.

$A_e$ is the paraxylene content of the three isomeric xylenes at equilibrium (under the particular temperature and pressure), expressed in volume percent.

$$\text{Degree of disproportionation} = \frac{D_p - D_f}{D_e - D_f}$$

wherein:

$D_p$ is the non-$C_8$ content of aromatics in the product, expressed in volume percent.

$D_f$ is the non-$C_8$ content of aromatics in the feed, expressed in volume percent.

$D_e$ is the non-$C_8$ content of aromatics at equilibrium, expressed in volume percent.

a decrease in hydrogenation of about 90 percent. Thus, it can be seen that both disproportionation and hydrogenation are considerably reduced by following the precepts of the present process.

It was also observed that using a fresh catalyst in the isomerization reaction for a period of hours was not equivalent to the catalyst being employed for the same number of hours in a hydrocracking zone. For example, the catalyst used in run 13 had been used for hydrocracking only 14 hours and for xylene isomerization about 280 hours. It can be seen that this did not give an effect to the catalyst that a comparable time in hydrocracking

TABLE

| Run No. | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| Catalyst | A | C | A | B | A | D | D | D | D | D | D | D | D | D | D | D | D | D |
| Reactor conditions: | | | | | | | | | | | | | | | | | | |
| Temperature, °F | 510 | 600 | 549 | 600 | 591 | 448 | 449 | 503 | 552 | 503 | 561 | 561 | 560 | 562 | 562 | 561 | 633 | 638 |
| LHSV | 1.8 | 1.5 | 2.0 | 1.5 | 1.9 | 2 | 2 | 2 | 5 | 2 | 4 | 3 | 2 | 2 | 2 | 1 | 2 | 2 |
| H$_2$ rate, s.c.f./bbl. feed | 7,200 | 4,500 | 6,700 | 4,500 | 7,000 | 5,000 | 5,000 | 5,000 | 2,000 | 5,000 | 2,500 | 3,300 | 5,000 | 5,000 | 5,000 | 10,000 | 5,000 | 5,000 |
| Total C$_8$ aromatics in liquid: | | | | | | | | | | | | | | | | | | |
| Product, vol. percent | 86.3 | 89.2 | 80.2 | 70.0 | 68.7 | 90.5 | 89.7 | 85.3 | 83.9 | 82.0 | 78.7 | 73.1 | 71.4 | 58.7 | 62.2 | 54.0 | 41.6 | 29.6 |
| Ethylbenzene | 19.6 | 24.6 | 17.8 | 18.6 | 15.5 | 23.7 | 22.6 | 21.1 | 21.0 | 21.1 | 20.6 | 18.1 | 18.4 | 14.7 | 16.4 | 14.2 | 11.3 | |
| Orthoxylene | 13.1 | 11.4 | 12.7 | 9.4 | 10.9 | 7.8 | 8.3 | 8.3 | 9.0 | 8.0 | 9.0 | 8.4 | 8.4 | 7.9 | 7.8 | 6.7 | 5.9 | 6.9 |
| Metaxylene | 43.5 | 42.1 | 38.2 | 31.0 | 30.9 | 51.9 | 50.1 | 48.4 | 45.6 | 44.6 | 41.2 | 38.1 | 36.3 | 28.5 | 29.7 | 25.1 | 17.8 | 4.3 |
| Paraxylene | 10.1 | 11.1 | 11.5 | 11.0 | 11.4 | 7.1 | 7.7 | 7.5 | 8.3 | 8.3 | 7.9 | 8.5 | 8.3 | 7.6 | 8.3 | 8.0 | 6.6 | 13.0 5.4 |
| Results: | | | | | | | | | | | | | | | | | | |
| Isomerization: | | | | | | | | | | | | | | | | | | |
| Paraxylene content of xylenes, percent | 15.1 | 17.2 | 18.4 | 21.4 | 16.6 | 10.7 | 11.6 | 11.7 | 13.2 | 13.7 | 13.6 | 15.5 | 15.7 | 17.4 | 18.0 | 20.0 | 21.8 | 23.5 |
| Paraxylene content of xylenes, percent of equilibrium | 63 | 73 | 77 | 91 | 91 | 45 | 48 | 49 | 56 | 57 | 57 | 65 | 66 | 73 | 76 | 84 | 93 | 100 |
| Disproportionation: | | | | | | | | | | | | | | | | | | |
| Gain in non-C$_8$ aromatics, percent absolute | 6.5 | 4.4 | 12.1 | 22.2 | 23.8 | 1.6 | 2.5 | 4.8 | 7.6 | 7.6 | 10.6 | 14.2 | 14.3 | 21.9 | 18.9 | 21.0 | 27.6 | 34.3 |
| Non-C$_8$ content of aromatics, percent | 8.2 | 4.9 | 14.2 | 24.2 | 26.7 | 3.3 | 4.3 | 5.8 | 9.8 | 10.0 | 13.3 | 17.7 | 18.1 | 23.4 | 24.7 | 29.4 | 41.2 | 54.8 |
| Hydrogenation: Loss in total aromatics, percent absolute | 2.2 | 1.0 | 2.7 | 2.4 | 2.5 | 1.4 | 1.3 | 3.4 | 2.0 | 3.9 | 4.2 | 6.2 | 7.8 | 12.9 | 12.4 | 18.5 | 24.3 | 29.6 |
| Degree of isomerization, percent | 35 | 43 | 60 | 81 | 84 | 2 | 8 | 10 | 21 | 24 | 24 | 38 | 40 | 52 | 57 | 72 | 87 | 100 |
| Degree of disproportionation, percent | 12 | 8 | 22 | 41 | 44 | 3 | 5 | 9 | 14 | 15 | 21 | 28 | 29 | 47 | 42 | 49 | 70 | 93 |

From the data presented in the table, it is apparent that the used catalysts of the present invention, shown in runs 1–5 (inclusive) give higher degrees of isomerization and lower degrees of disproportionation than the essentially fresh catalyst represented by runs 6–18. To better show this desirable result, these two degrees were plotted and are shown in the accompanying figure. In the figure, the degree of isomerization is plotted along the ordinate and the degree of disproportionation is plotted along the abscissa. The numbers alongside the points of the two curves refer to the run numbers shown in the table. It can be seen that all of the fresh catalyst runs fall along curve A and all of the aged catalyst runs fall along curve B. The improvement in the isomerization process of the present invention is graphically shown by these curves. Thus, employing a used catalyst, a degree of isomerization of, for example, 60 percent will be accompanied by a degree of disproportionation of 22 percent, whereas, in the case of the fresh catalyst, a 60 percent degree of isomerization will be accompanied by a degree of disproportionation of 47 percent.

The data presented in the table also show the considerable reduction in undesirable hydrogenation that results from using the aged catalyst of the invention. Thus, for example, runs 4 and 17 both give a product wherein the percent of equilibrium of the paraxylenes in the xylenes is about the same (91 to 92.5 percent), but the used catalyst of run 4 only leads to an absolute loss in aromatics of about 2.4 percent whereas the fresh catalyst of run 17 leads to an absolute loss of aromatics of 24.3 percent, or would do since point 13 still remains on curve A. A fresh catalyst with the same number of hours in use as a hydrocracking catalyst would, when the degrees of isomerization and disproportionation were plotted, fall along curve B. Thus, xylene isomerization is not a substitute for hydrocracking in aging the catalyst.

I claim:

1. A process for the isomerization of a non-equilibrium xylene feed containing at least one xylene isomer which comprises contacting said feed, along with added hydrogen, in an isomerization zone with a catalyst comprising a hydrogenating component selected from the group consisting of nickel sulfide and cobalt sulfide disposed on an active siliceous cracking catalyst support at a pressure above about 300 p.s.i.g., and at an elevated temperature below about 800° F., said catalyst having previously been used for the hydrocracking of distillate fractions for at least 100 hours, and recovering from said isomerization zone a product stream having a substantially closer approach to alkyl benzene isomerization equilibrium than said feed.

2. The process of claim 1, wherein the product stream is equal to at least 80 volume percent of said feed and contains at least 65 volume percent C$_8$ aromatic hydrocarbons.

References Cited in the file of this patent

UNITED STATES PATENTS 2,784,241    Holm    Mar. 5, 1957
2,944,089    Scott    July 5, 1960